(12) United States Patent
Shin et al.

(10) Patent No.: US 12,325,285 B2
(45) Date of Patent: Jun. 10, 2025

(54) HEAT EXCHANGER FOR VEHICLE

(71) Applicant: ESTRA AUTOMOTIVE SYSTEMS CO., LTD., Daegu (KR)

(72) Inventors: Young Sam Shin, Daegu (KR); Jeong Kyu Park, Daegu (KR); Jun Ho Choi, Daegu (KR)

(73) Assignee: ESTRA AUTOMOTIVE SYSTEMS CO., LTD., Daegu (KR)

( * ) Notice: Subject to any disclaimer, the term of this patent is extended or adjusted under 35 U.S.C. 154(b) by 181 days.

(21) Appl. No.: 18/028,813

(22) PCT Filed: Sep. 29, 2021

(86) PCT No.: PCT/KR2021/013303
§ 371 (c)(1),
(2) Date: Mar. 28, 2023

(87) PCT Pub. No.: WO2022/071739
PCT Pub. Date: Apr. 7, 2022

(65) Prior Publication Data
US 2023/0331066 A1      Oct. 19, 2023

(30) Foreign Application Priority Data

Sep. 29, 2020   (KR) .................. 10-2020-0127198

(51) Int. Cl.
*F28F 19/00*   (2006.01)
*B60H 1/00*    (2006.01)
(Continued)

(52) U.S. Cl.
CPC ....... *B60H 1/3227* (2013.01); *B60H 1/00278* (2013.01); *F28D 21/00* (2013.01); *F28F 3/08* (2013.01); *F28D 2021/008* (2013.01)

(58) Field of Classification Search
CPC .... B60H 1/3227; B60H 1/00278; F28D 21/00
(Continued)

(56) References Cited

U.S. PATENT DOCUMENTS 9,093,729 B2      7/2015   Wesner et al.
2014/0013787 A1   1/2014   Wesner et al.
2019/0264984 A1   8/2019   Takagi et al.

FOREIGN PATENT DOCUMENTS

CN      106123408 A   *  11/2016
JP      2016-001099 A     1/2016
(Continued)

OTHER PUBLICATIONS

International Search Report for PCT/KR2021/013303 dated Jan. 3, 2022.

*Primary Examiner* — Davis D Hwu
(74) *Attorney, Agent, or Firm* — Sughrue Mion, PLLC

(57) ABSTRACT

A heat exchanger for a vehicle configured to perform heat exchange between coolant and refrigerant includes: a plurality of stacked plates sequentially stacked to form a plurality of refrigerant spaces filled with the refrigerant and a plurality of coolant spaces filled with the coolant; a thermal expansion valve disposed in the vicinity of the plurality of the stacked plates; and a connection block disposed between the thermal expansion valve and the plurality of stacked plates. The connection block comprises a refrigerant inlet passage for introducing the refrigerant introduced through the thermal expansion valve into the plurality of the stacked plates and a refrigerant discharge passage for introducing the refrigerant discharged from the plurality of the stacked plates into the thermal expansion valve. The plurality of the stacked plates are configured to form a refrigerant passage for moving the refrigerant introduced through the refrigerant inlet passage, and a refrigerant bypass passage connected to (Continued)

the refrigerant passage to discharge the refrigerant to the refrigerant discharge passage.

5 Claims, 18 Drawing Sheets

(51) Int. Cl.
 *B60H 1/32* (2006.01)
 *F28D 21/00* (2006.01)
 *F28F 3/08* (2006.01)
(58) Field of Classification Search
 USPC .......................................................... 165/41
 See application file for complete search history.

(56) References Cited

FOREIGN PATENT DOCUMENTS

| | | | |
|---|---|---|---|
| JP | 2019-105423 A | | 6/2019 |
| KR | 20110081613 A | * | 7/2011 |
| KR | 10-2013-0142517 A | | 12/2013 |
| KR | 10-2019-0046722 A | | 5/2019 |

* cited by examiner

[FIG. 1]
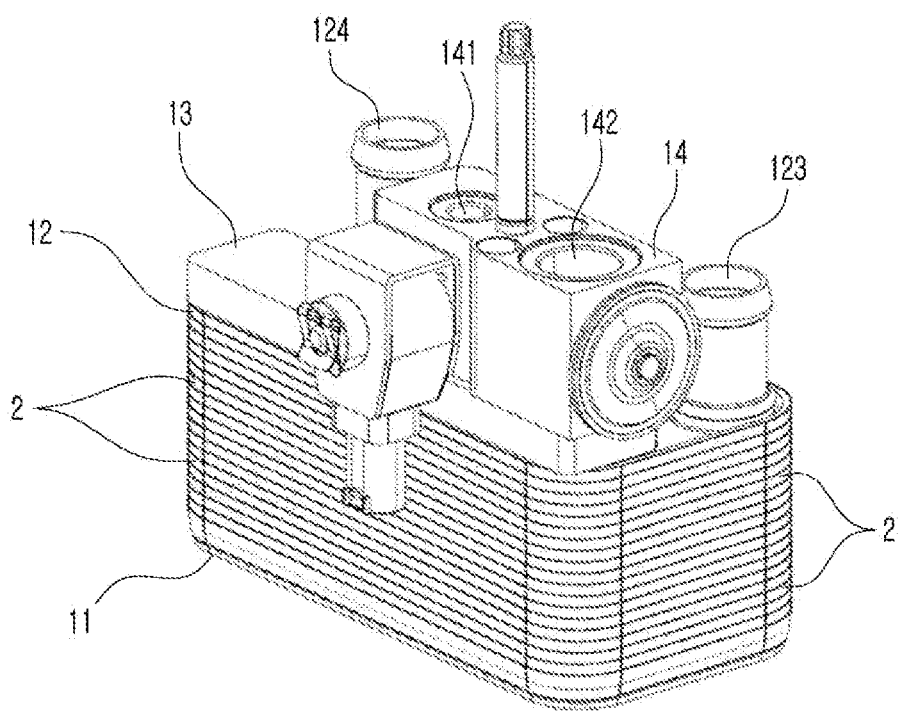

[FIG. 2]
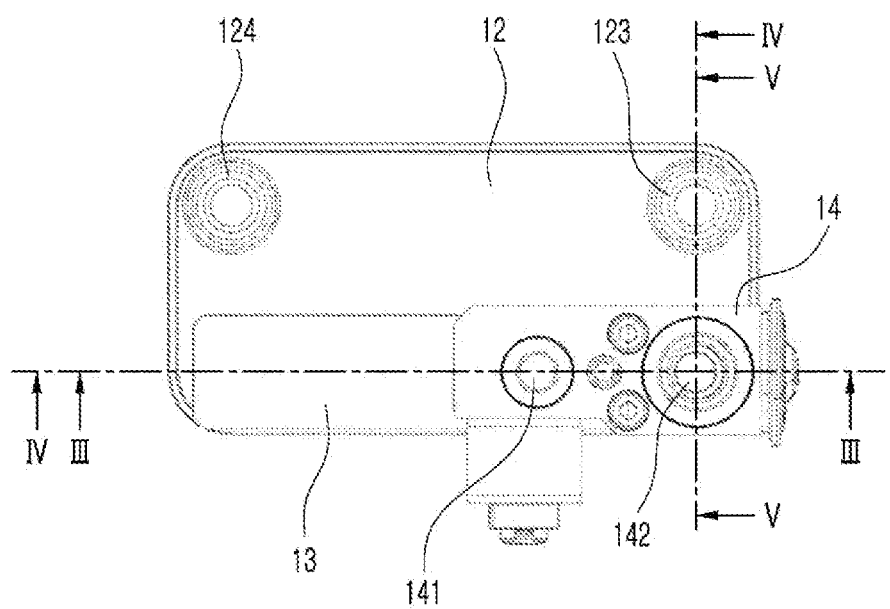

[FIG. 3]
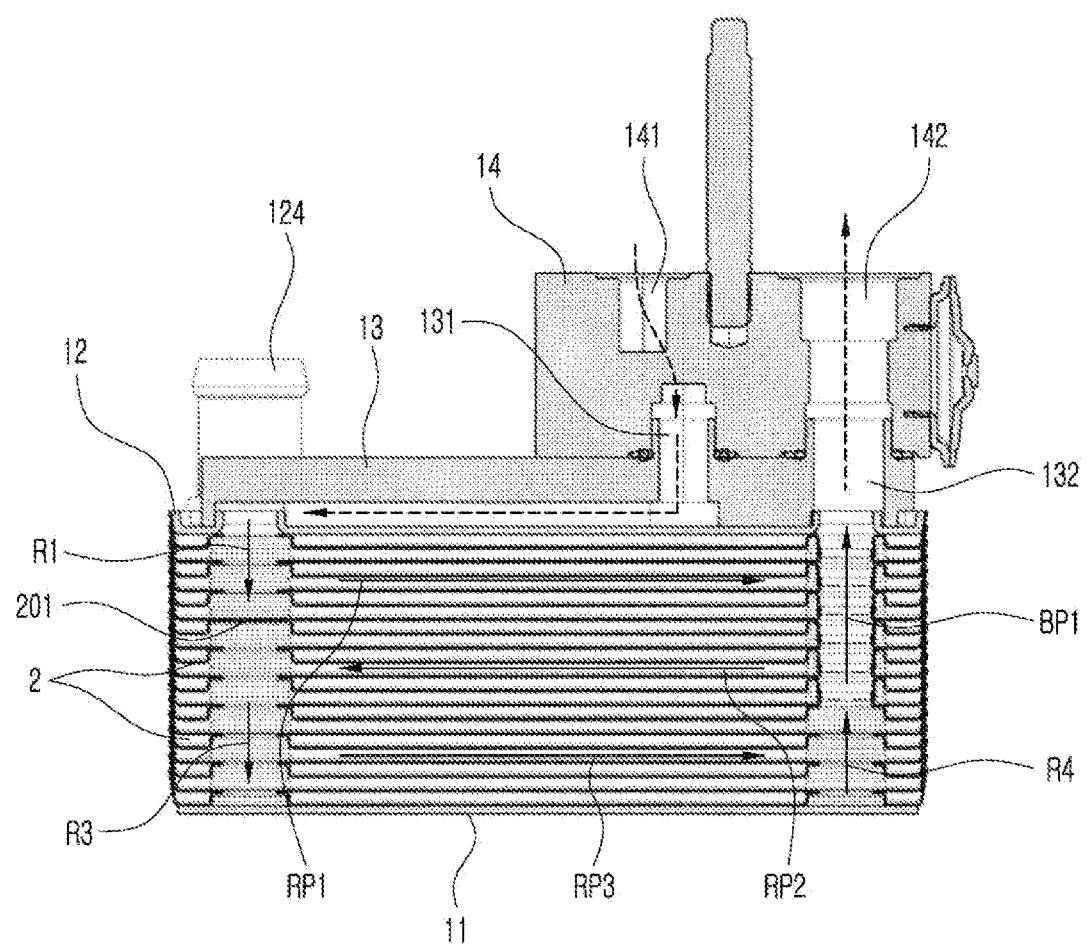

[FIG. 4]
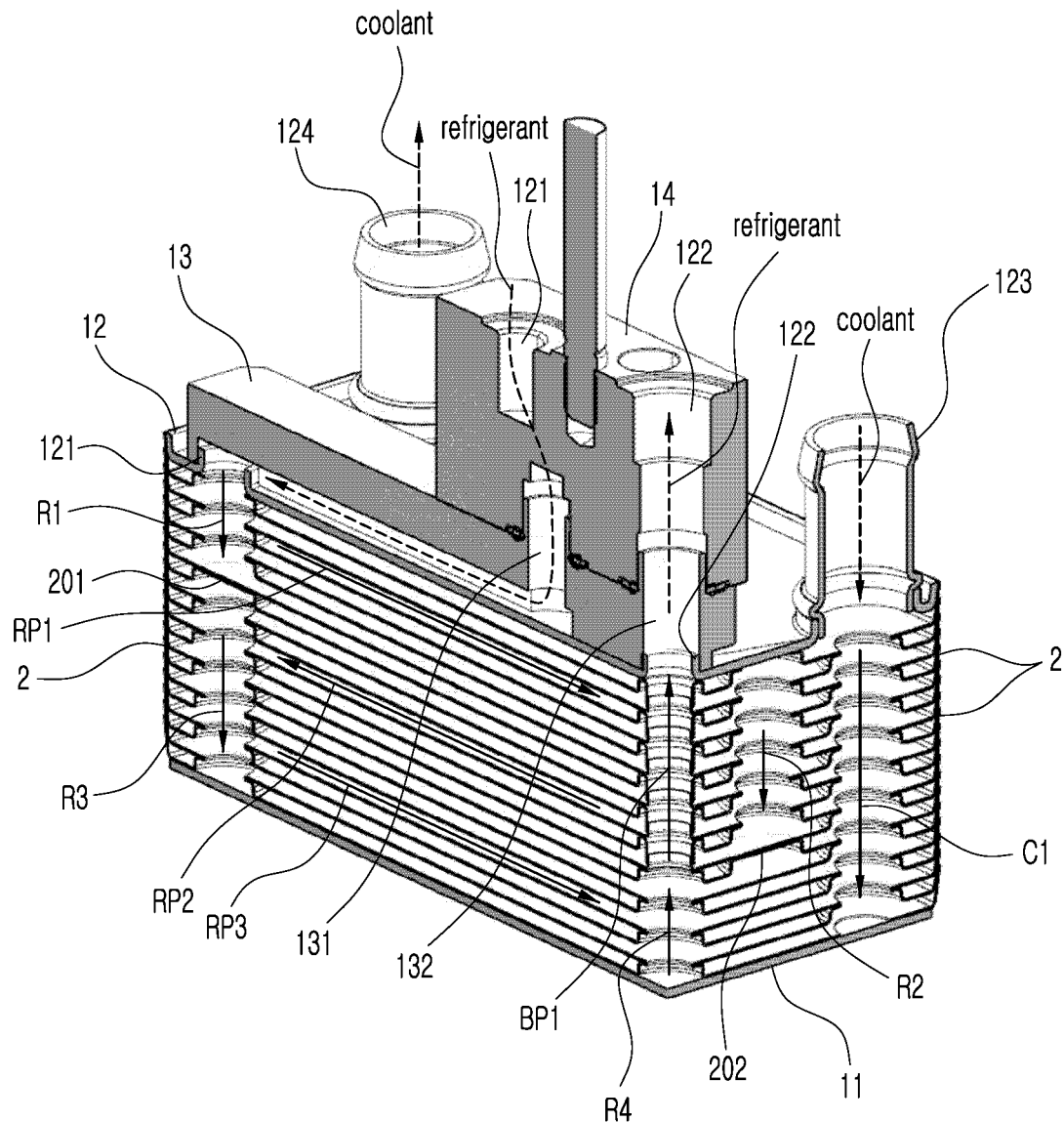

[FIG. 5]
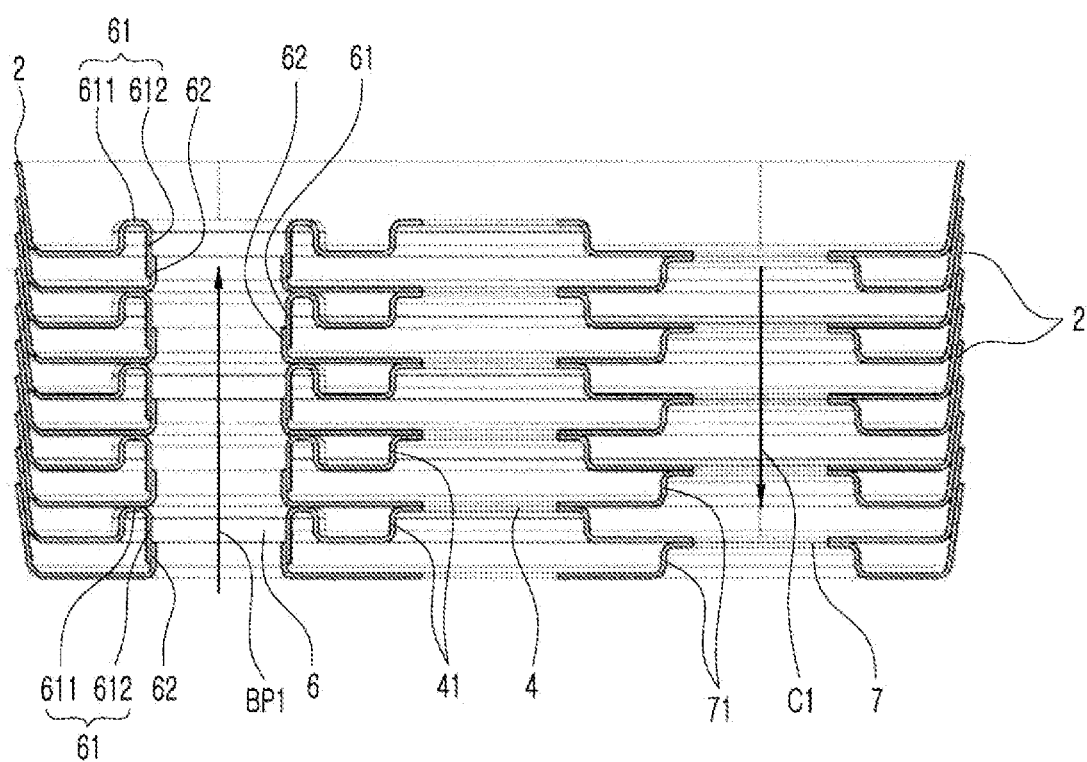

[FIG. 6]
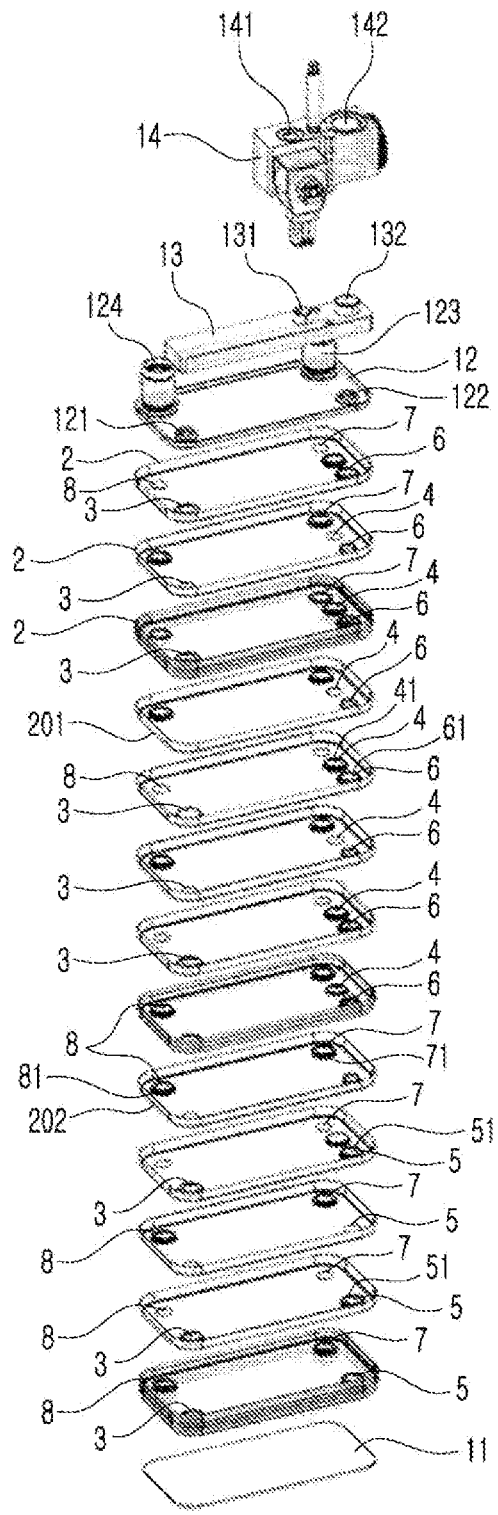

[FIG. 7]
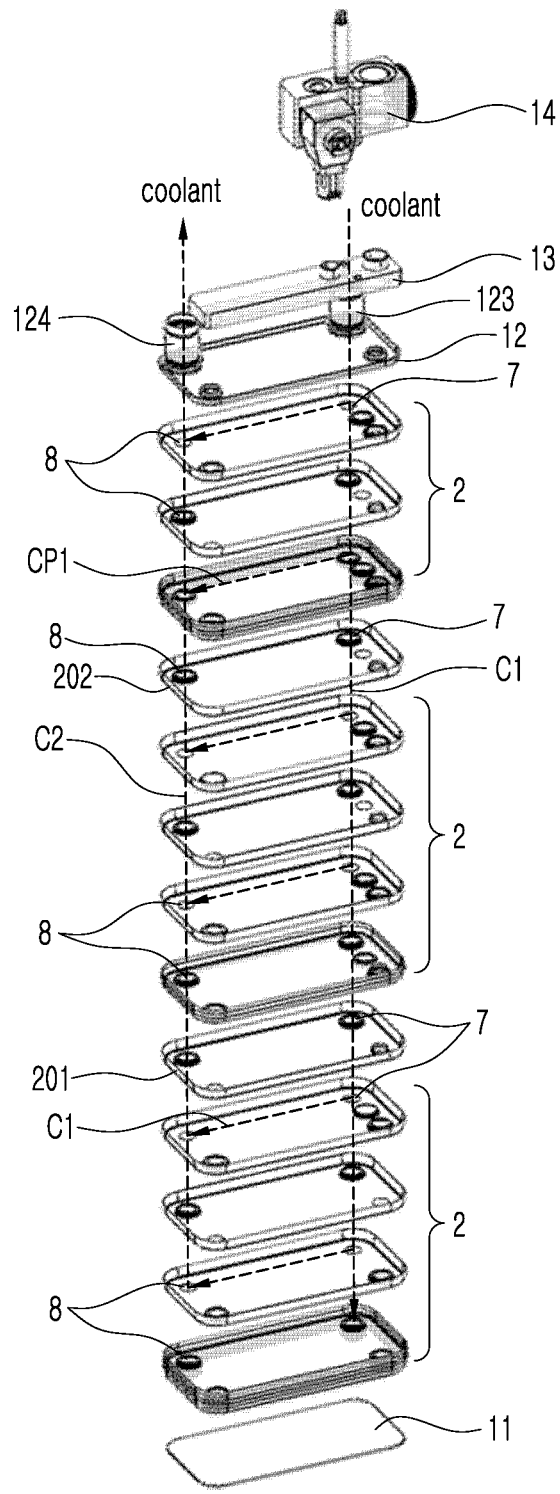

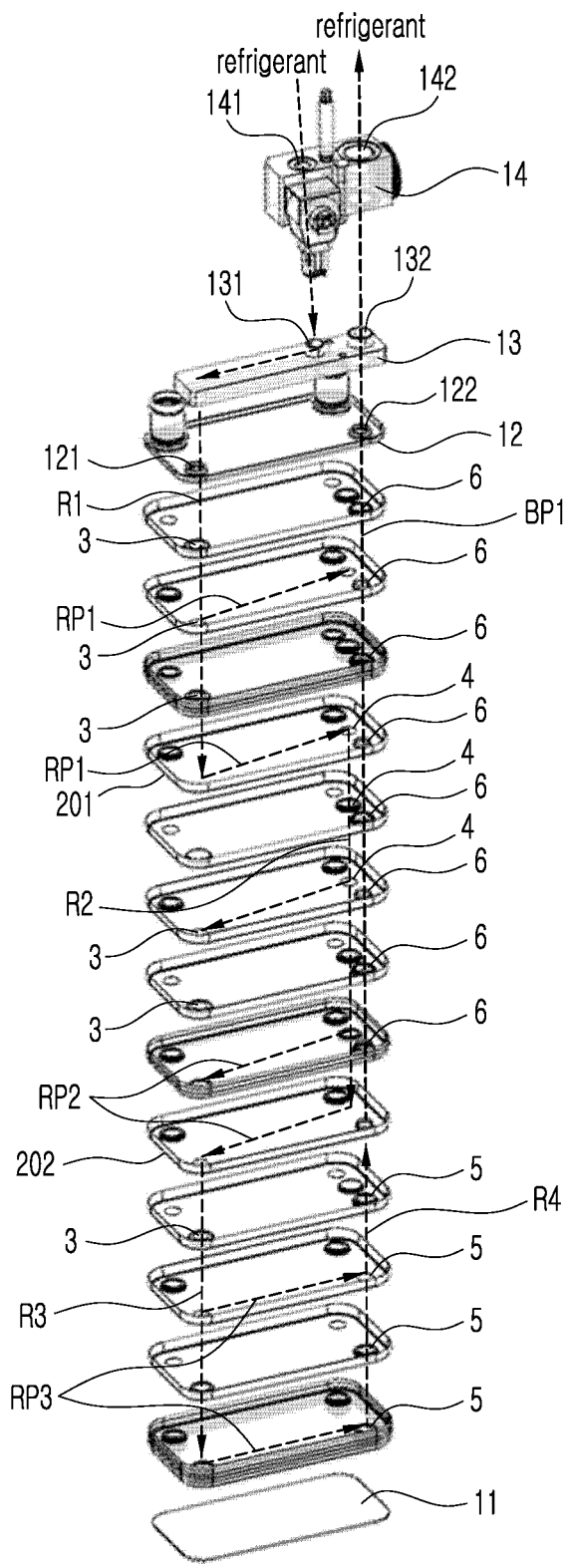
[FIG. 8]

[FIG. 9]
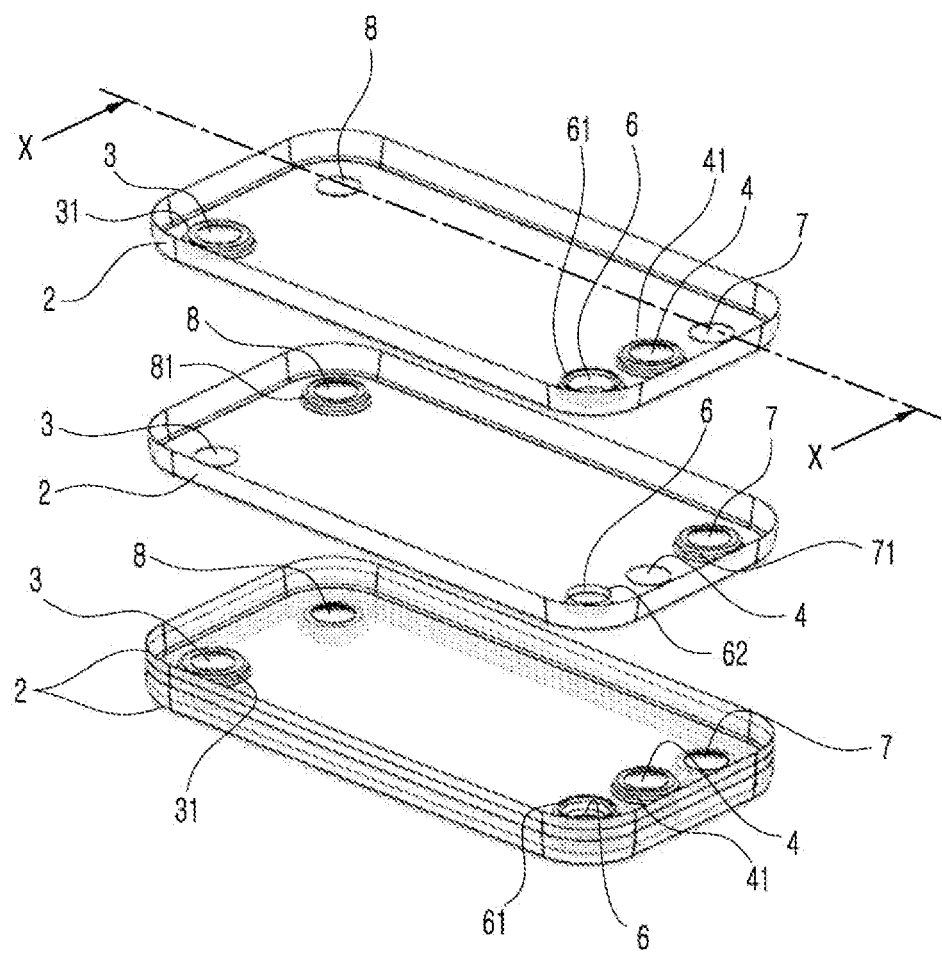

[FIG. 10]
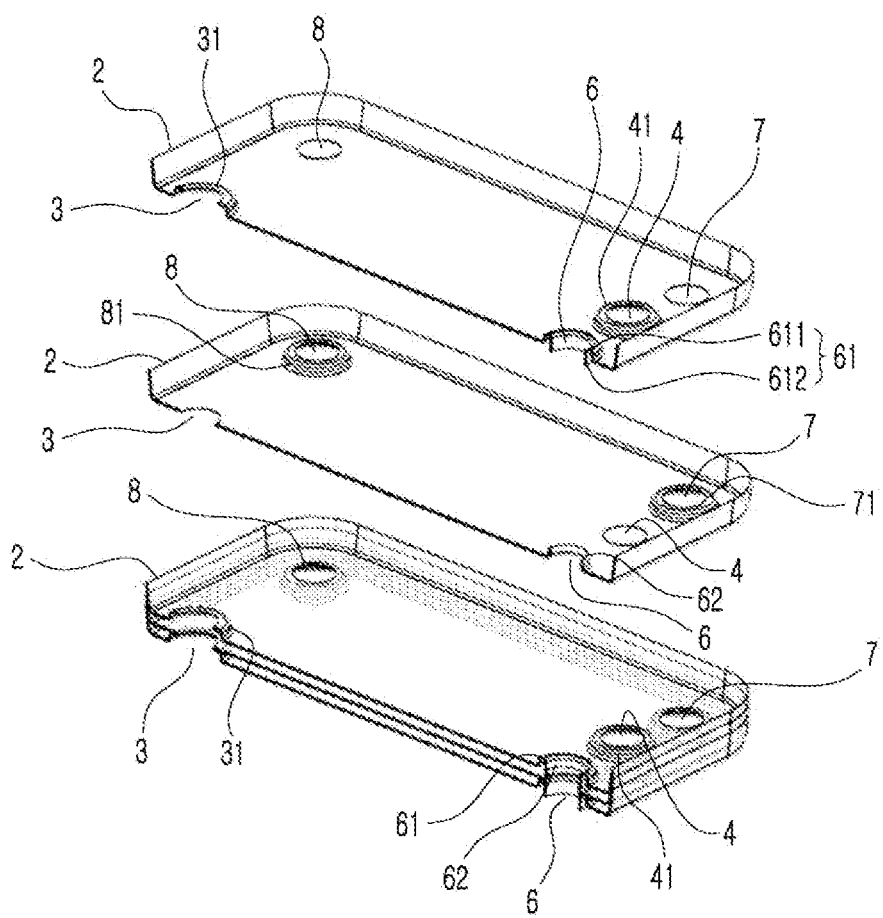

[FIG. 11]
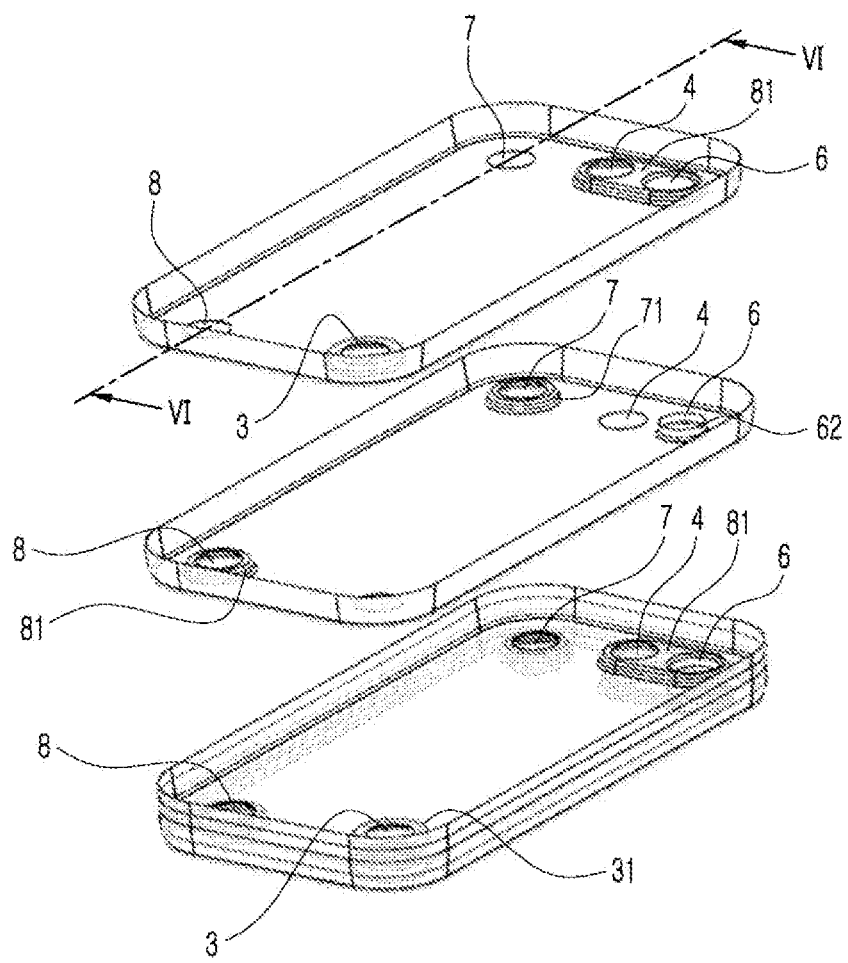

【FIG. 12】
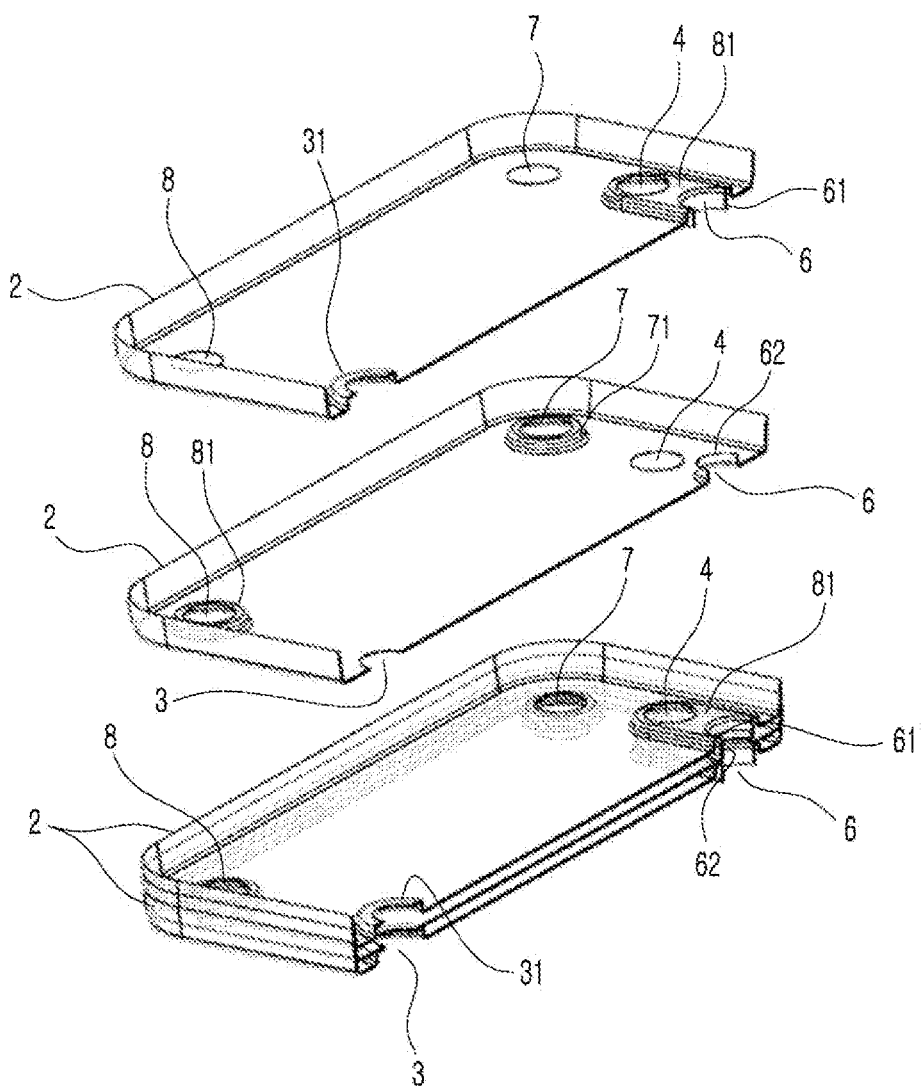

[FIG. 13]
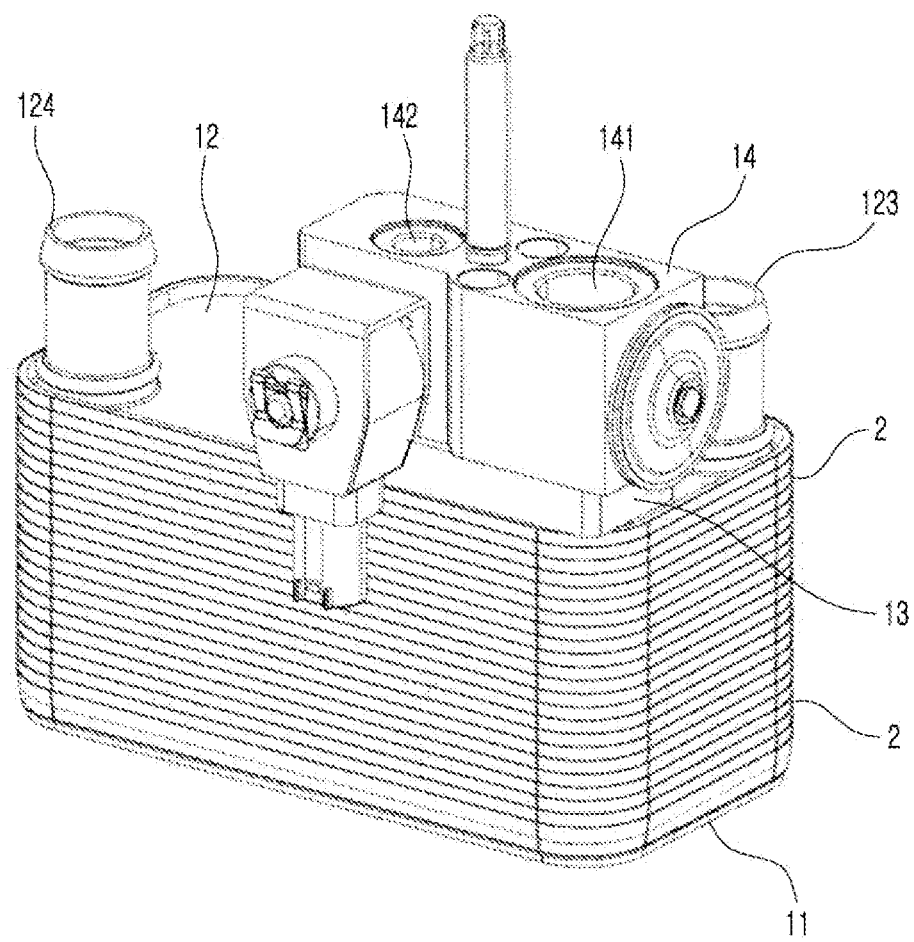

【FIG. 14】
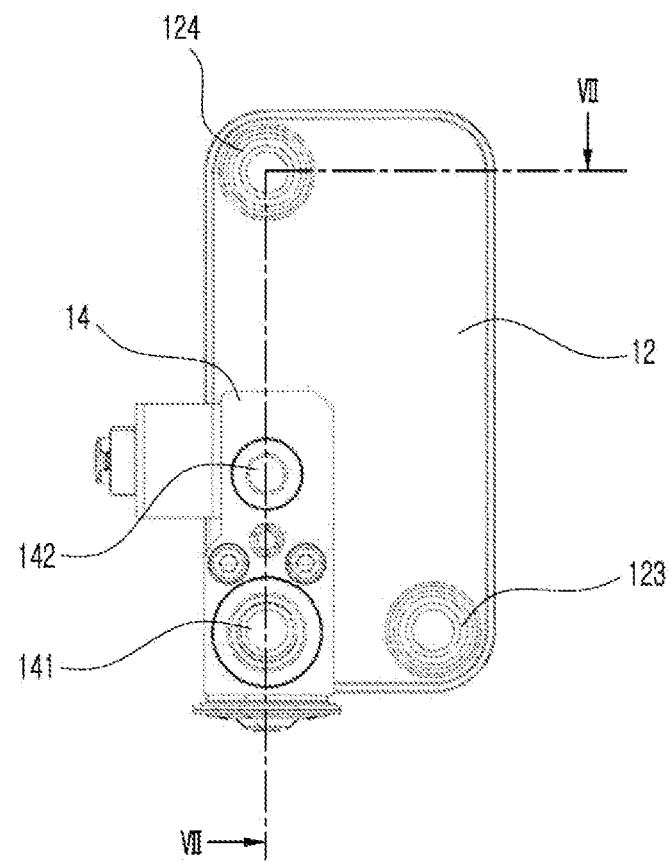

[FIG. 15]
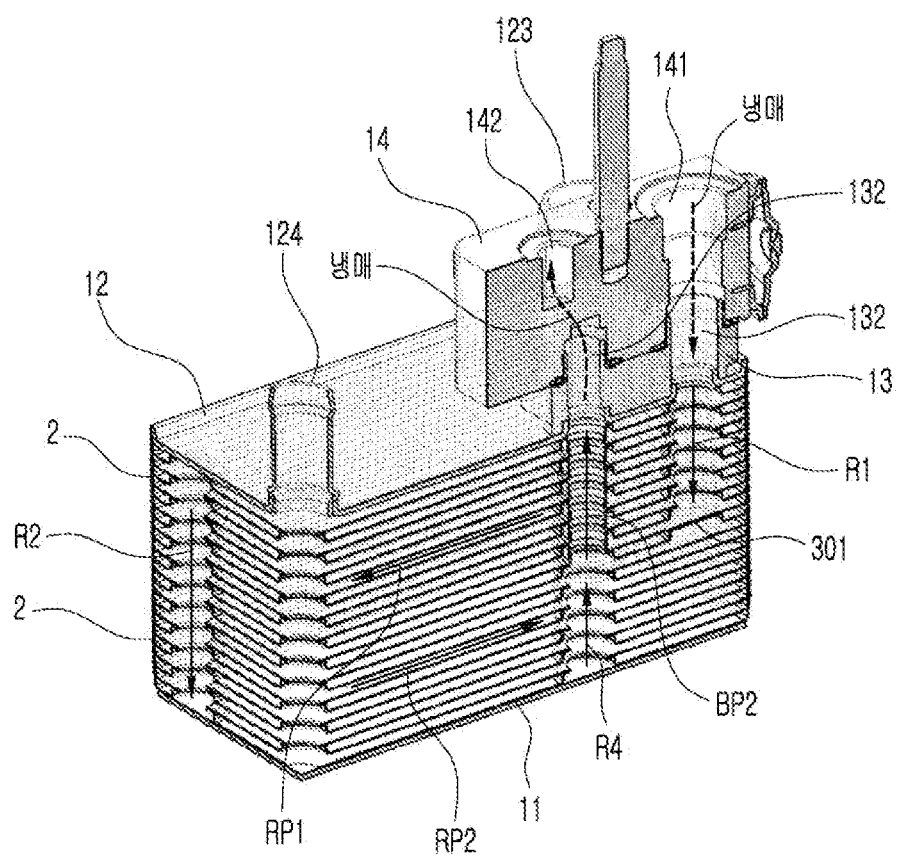

[FIG. 16]
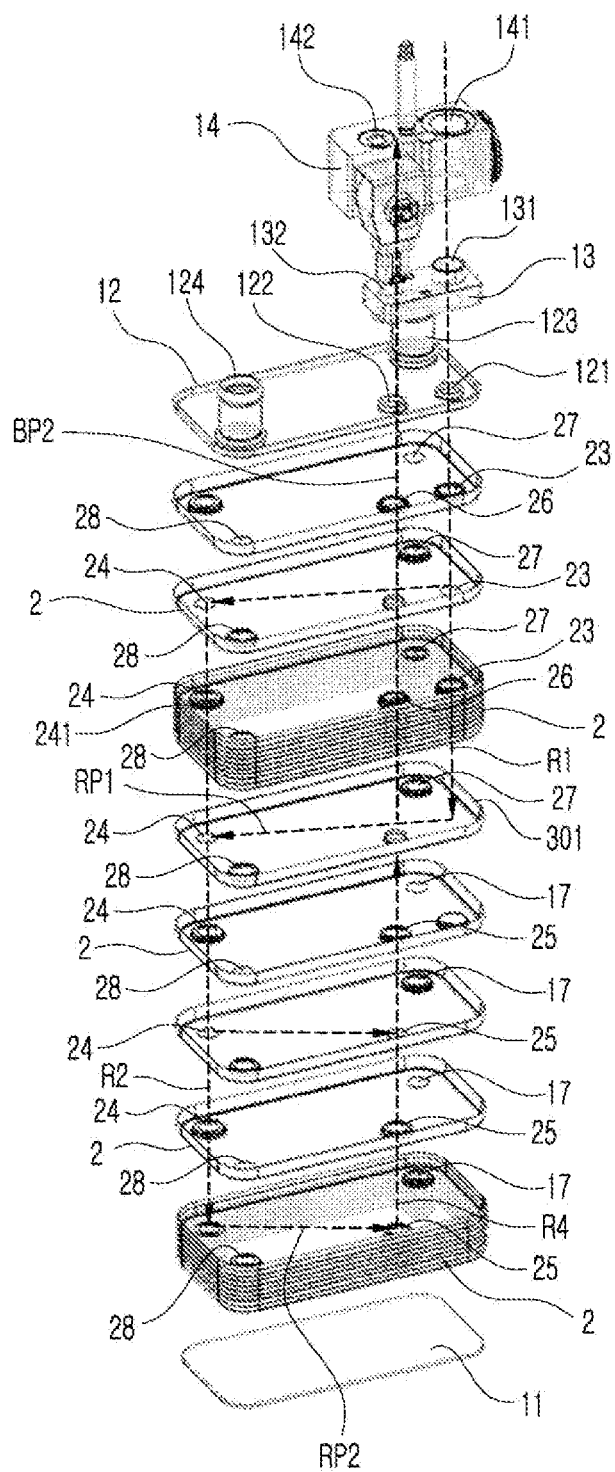

[FIG. 17]
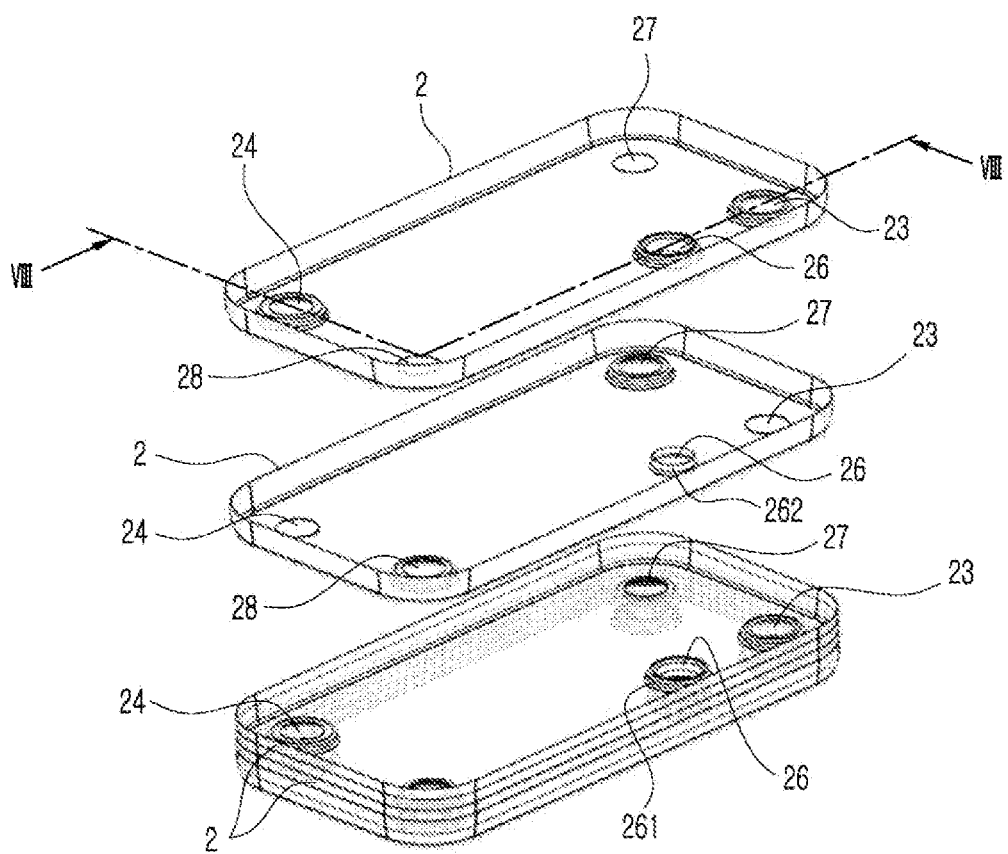

[FIG. 18]
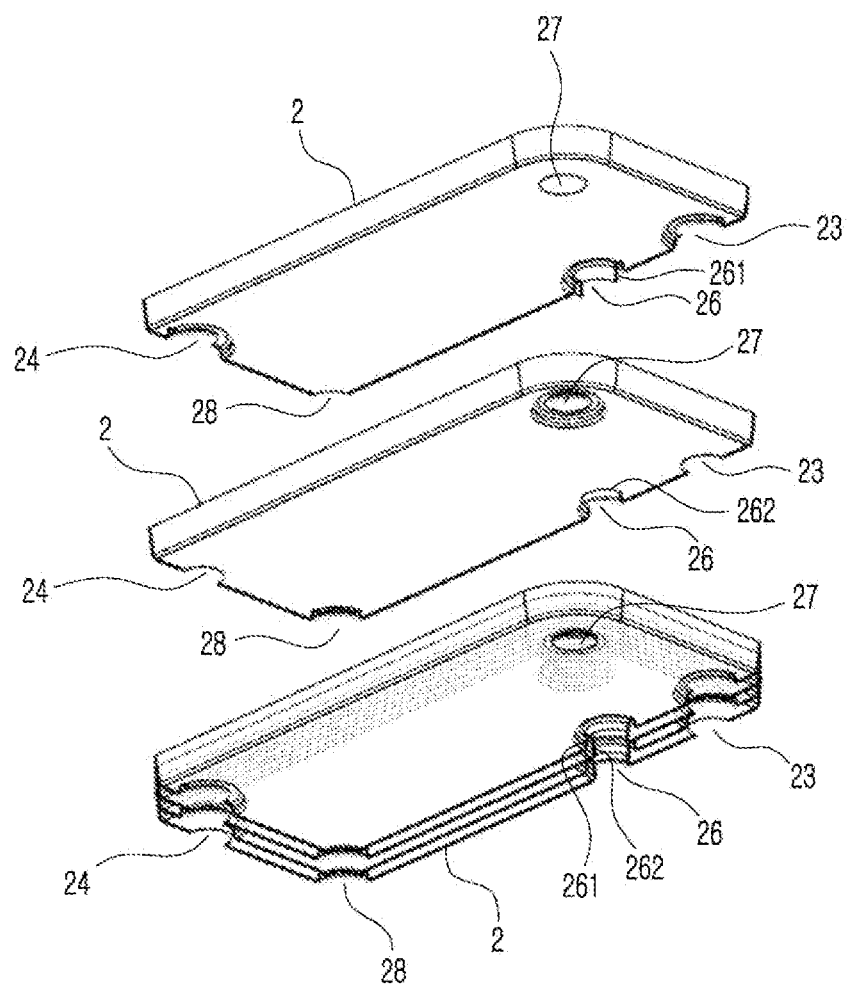

HEAT EXCHANGER FOR VEHICLE

CROSS REFERENCE TO RELATED APPLICATIONS

This application is a National Stage of International Application No. PCT/KR2021/013303 filed Sep. 29, 2021, claiming priority based on Korean Patent Application No. 10-2020-0127198 filed Sep. 29, 2020.

TECHNICAL FIELD

The present invention relates to a heat exchanger for vehicles that is configured to perform heat exchange between liquid coolant and refrigerant.

BACKGROUND ART

A so-called liquid cooled heat exchanger is configured to exchange heat between a flow of liquid coolant and a flow of refrigerant. Such a heat exchanger may be used as a vehicle chiller for recovering waste heat and cooling a battery in a heat pump system of a vehicle.

In order to improve the performance of the vehicle chiller, it is common to configure a refrigerant flow path in the refrigerator with two or more flow paths instead of a single flow path, and when the refrigerant flow path is not a single flow path, the refrigerant inlet and outlet are located on opposite sides. If the inlet and outlet of the refrigerant are located on opposite sides, a separate refrigerant pipe must be constructed outside the chiller to configure the refrigerant inlet and outlet on the same side for the package of the chiller. There is a problem in that the volume of the chiller increases due to the chiller pipe and the process for assembling the pipe is added. In addition, the structure of the jig becomes complicated during brazing of the chiller and productivity deteriorates due to its large volume.

PRIOR ART DOCUMENT

U.S. Pat. No. 9,093,729 (2015.07.28.)

DETAILED DESCRIPTION OF THE INVENTION

Technical Problem

An object to be solved by the present invention is to provide a vehicle heat exchanger having excellent productivity as well as a simple assembly process due to the deletion of refrigerant pipes.

Technical Solution

According to an embodiment of the present invention, a heat exchanger for a vehicle configured to perform heat exchange between coolant and refrigerant includes: a plurality of stacked plates sequentially stacked to form a plurality of refrigerant spaces filled with the refrigerant and a plurality of coolant spaces filled with the coolant; a thermal expansion valve disposed in the vicinity of the plurality of the stacked plates; and a connection block disposed between the thermal expansion valve and the plurality of stacked plates. The connection block comprises a refrigerant inlet passage for introducing the refrigerant introduced through the thermal expansion valve into the plurality of the stacked plates and a refrigerant discharge passage for introducing the refrigerant discharged from the plurality of the stacked plates into the thermal expansion valve. The plurality of the stacked plates are configured to form a refrigerant passage for moving the refrigerant introduced through the refrigerant inlet passage, and a refrigerant bypass passage connected to the refrigerant passage to discharge the refrigerant to the refrigerant discharge passage.

The refrigerant passage may include a first refrigerant inlet passage extending downward, a second refrigerant inlet passage extending downward from a position spaced apart from the first refrigerant inlet passage, a first lateral path extending in a lateral direction to connect the first and the second refrigerant inlet passages, a refrigerant discharge passage extending upward from a position spaced apart from the second refrigerant inlet passage, and a second lateral path extending in a lateral direction to connect the second refrigerant inlet passage and the refrigerant discharge passage.

The first refrigerant inlet passage may be formed at the same position as the refrigerant inlet passage, and the refrigerant discharge passage may be formed at the same position as the refrigerant discharge passage.

The refrigerant passage may includes a first refrigerant inlet passage extending downward, a second refrigerant inlet passage extending downward from a position spaced apart from the first refrigerant inlet passage, a first lateral path extending in a lateral direction to connect the first and second refrigerant inlet passages, a third refrigerant inlet passage extending downward from a position spaced apart from the second refrigerant inlet passage, a second lateral path extending in a lateral direction to connect the second and third refrigerant inlet passages, a refrigerant discharge passage extending upward from a position spaced apart from the third refrigerant inlet passage, and a third lateral path extending in a lateral direction to connect the third refrigerant inlet passage and the refrigerant discharge passage.

The first refrigerant inlet passage may be formed at a position spaced apart from the refrigerant inlet passage, and the refrigerant inlet passage may be configured to move the refrigerant introduced from the thermal expansion valve in a lateral direction and then supply the refrigerant to the first refrigerant inlet passage.

The refrigerant discharge passage and the refrigerant bypass passage formed in the plurality of the stacked plates may be formed at the same position as the refrigerant discharge passage provided in the connection block.

Effect of the Invention

According to the present invention, by eliminating pipes for refrigerant pipe and forming the refrigerant bypass passage by coupling the female flange and the male flange, the assembly process of the heat exchanger can be simplified and productivity can be improved.

BRIEF DESCRIPTION OF THE DRAWINGS

FIG. 1 is a perspective view of a heat exchanger for vehicles according to an embodiment of the present invention.

FIG. 2 is a top view of a heat exchanger for vehicles according to an embodiment of the present invention.

FIG. 3 is a sectional view taken along a line III-III in FIG. 2.

FIG. 4 is a sectional view taken along a line IV-IV in FIG. 2.

FIG. 5 is a partial sectional view taken along a line V-V in FIG. 2.

FIG. 6 is an exploded perspective view of a heat exchanger for vehicles according to an embodiment of the present invention.

FIG. 7 is a drawing in which flow of coolant is indicated in the exploded perspective view of FIG. 6.

FIG. 8 is a drawing in which flow of refrigerant is indicated in the exploded perspective view of FIG. 6.

FIG. 9 is a perspective view showing some of stacked plates of a heat exchanger for vehicles according to an embodiment of the present invention.

FIG. 10 is a sectional view taken along a line X-X in FIG. 9.

FIG. 11 is a perspective view showing some of stacked plates of a heat exchanger for vehicles according to an embodiment of the present invention.

FIG. 12 is a sectional view taken along a line VI-VI in FIG. 11.

FIG. 13 is a perspective view of a heat exchanger for vehicles according to another embodiment of the present invention.

FIG. 14 is a top view of a heat exchanger for vehicles according to another embodiment of the present invention.

FIG. 15 is a sectional view taken along a line VII-VII in FIG. 14.

FIG. 16 is an exploded perspective view of a heat exchanger for vehicles according to another embodiment of the present invention.

FIG. 17 is a perspective view of some of stacked plates of a heat exchanger for vehicles according to another embodiment of the present invention.

FIG. 18 is a sectional view taken along a line VIII-VIII in FIG. 17.

EMBODIMENT OF THE INVENTION

Hereinafter, embodiments of the present invention will be described in detail with reference to the accompanying drawings.

A heat exchanger for a vehicle according to an embodiment of the present invention forms a flow of a liquid coolant and a flow of a refrigerant adjacent to each other so that heat is transferred between the liquid coolant and the refrigerant, and may be used as a chiller that is used for recovering waste heat from the system or cooling the battery in a vehicle heat pump system. The heat exchanger may be configured to cool the coolant by absorbing heat from the coolant with the refrigerant.

Referring to FIG. 1 to FIG. 5, a plurality of stacked plates 2 are sequentially stacked in a height direction, and between the laminated plates 2, a refrigerant space filled with refrigerant and a coolant space filled with coolant can be alternately formed. Each stacked plate 2 may be formed of a plate-like member having a substantially rectangular shape and may have a flange at an edge. Each laminated plate 2 is stacked with flanges in close contact with each other to alternately form a refrigerant space and a coolant space. The stacked plates 2 form first through holes 3, 4 and 5, second through holes 6 for refrigerant flow, and third through holes 7, 8 for coolant flow. It is configured that the refrigerant and the coolant enter and exit from the same side of the heat exchanger, namely the top side. Referring to FIG. 4, FIG. 6, and FIG. 8, the first through holes indicated by reference numerals 3 and 4 provide refrigerant inlet passages R1, R2, and R3 for inflow of refrigerant in a downward direction, and the first through hole indicated by numeral 5 forms a refrigerant return passage R4 for upward movement of the refrigerant. The second through hole 6 forms a refrigerant bypass passage BP1 through which the refrigerant is bypassed to the outside. Referring to FIG. 4 and FIG. 7, the third through holes 7 and 8 form a coolant inflow passage C1 and a coolant discharge passage C2 for coolant to flow in and out, respectively. At this time, the through holes indicated by reference numerals 4 and 5 may be formed on the opposite side of the through hole indicated by reference numeral 3, and the second through hole 6 may be formed at the same position as the first through hole indicated by reference numeral 5. A third through hole indicated by reference numeral 7 may be formed in the vicinity of the first through hole indicated by reference numeral 4, and a third through hole indicated by reference numeral 8 may be formed on the opposite side of the through hole indicated by reference numeral 7.

A base panel 11 and a cover panel 12 may be respectively disposed below and above the plurality of stacked plates 2. The base panel 11 may be formed as a flat plate without a through hole and may be closely adhered to the lower surface of the lowermost stacked plate 2. The cover panel 12 may adhere to the top of the uppermost stacked plate 2. The cover panel 12 may have a refrigerant inlet 121 communicating with the first through hole 2, i.e., the refrigerant inlet passage R1, a refrigerant outlet 122 communicating with the second through hole 6, i.e., the refrigerant bypass passage BP1, and a coolant inlet 123 and a coolant outlet 124 respectively communicating with the coolant inlet and outlet passages C1 and C2.

A connection block 13 may be fixed on the cover panel 12. The connection block 13 may include a refrigerant inlet passage 131 communicating with the refrigerant inlet 121 of the cover panel 12 and a refrigerant outlet passage 132 communicating with the refrigerant outlet 122 of the cover panel 12. A thermal expansion valve 14 may be fixed to the connection block 13. The thermal expansion valve 14 includes a refrigerant inlet passage 141 communicating with the refrigerant inlet passage 131 of the connection block 13 and a refrigerant outlet passage 142 communicating with the refrigerant outlet passage 132 of the connection block 13.

Through these passages, the refrigerant introduced into the refrigerant inlet passage 141 of the thermal expansion valve 14 fills the refrigerant space formed between the stacked plates 2 and is then discharged to the refrigerant outlet passage 142, and the coolant introduced into the coolant inlet 123 of the cover panel 12 fills the coolant space formed between the stacked plates 2 and is then discharged through the coolant outlet 124. Heat of the coolant is transferred to the refrigerant by the flow of the refrigerant and the flow of the coolant so that the coolant can be cooled, and the refrigerant absorbing the heat may be evaporated in the thermal expansion valve 14.

According to an embodiment of the present invention, the stacked plate 2 is configured to form three lateral paths RP1, RP2 and RP3. That is, referring to FIG. 4 and FIG. 8, the stacked plate 2 is configured to form three lateral paths RP1, RP2, and RP3 extending substantially transversely to a direction in which the refrigerant flows, that is, the downward direction. At this time, the refrigerant bypass passage BP1 is formed substantially upward, and thereby the refrigerant can be discharged to the same side as the introduced side.

For such a refrigerant flow path, the stacked plates 2 include two partitioning plates 201 and 202. The partitioning plate indicated by reference numeral 201 does not have the first through hole indicated by reference numeral 3, and the refrigerant above the partitioning plate 201 moves along the first lateral path RP1 and the refrigerant below the partitioning plate 201 moves along the second lateral path RP2. The partitioning plate indicated by reference numeral 202 does not have the first through hole indicated by reference numeral 4, and the refrigerant above the partitioning plate 202 moves along the second lateral path RP2 and the refrigerant below the partitioning plate 202 moves along the third lateral path RP3. The refrigerant passing through the second through hole 6 of the partitioning plate 202 is discharged through the bypass passage BP1.

Furthermore, the stacked plate 2 forms a coolant inflow passage C1 and a coolant discharge passage C2 respectively extending in a vertical direction via the third through holes 7 and 8, and it is configured that coolant in each coolant space moves in a lateral direction to form the lateral path C2.

The first to third through holes 3, 4, 5, 6, 7, and 8 may be formed on a flat surface in each stacked plate 2 or on the flanges 31, 41, 51, 61, 71, and 81 that protrude from the surface thereof, and in order to form such passages as described above, a through hole formed on a flat surface of the stacked plate 2 and a through hole formed in the flanges 31, 41, 41, 61, 71, and 81 may be alternately provided in the stacked plates 2 sequentially disposed in a vertical direction. At this time, the first and second through holes 3, 4, 5, and 6 are equally formed on the flat surface or the flanges 31, 41, 51, and 61 on the same stacked plate, and on the other hand the third through holes 7 and 8 is equally formed on the flanges 71 and 81 or on the flat surface.

At this time, the bypass passage BP1 is formed by male-female coupling of a female flange 61 and a male flange 62 respectively provided on adjacent stacked plates 2. Referring to FIG. 5, FIG. 9 and FIG. 10, the upper stacked plate 2 among the two vertically adjacent plates 2 has a female flange 61 protruding downward, and the lower stacked plate 2 has a male flange 62 protruding upward and inserted into the female flange 61. At this time, the female flange 61 and the male flange 62 respectively form a through hole 6, and the refrigerant bypass passage BP1 is formed by the male-female coupling of the female flange 61 and the male flange 62. Since in an embodiment of the present invention the refrigerant bypass passage is formed through the coupling of male and female flanges without inserting a separate pipe, the structure is simple and manufacturing becomes easy, and the position of the bypass passage can be easily changed by changing the position of the flanges in the stacked plates, and thus the bypass passage can be formed at a desired location without interference with neighboring parts.

More specifically, referring to FIG. 5 and FIG. 10, the female flange 61 includes a protruding support 611 that protrudes upward and contacts the lower surface of the stacked plate 2 positioned directly above and an insertion portion 612 that extends vertically from an end of the protruding support 611, and the male flange 62 is inserted into the insertion portion 612. The male flange 62 and the insertion portion 612 are fastened to each other to achieve fluid sealing, and the protruding support 611 is also closely adhered to the lower surface of the stacked plate 2 to achieve fluid sealing. As a result, a refrigerant bypass passage BP1 fluidly separated from other spaces between the stacked plates 2 is formed.

FIG. 11 and FIG. 12 show stacked plates according to another embodiment of the present invention. In this embodiment, the first through hole 4 for forming the refrigerant inlet passage R2 and the second through hole 6 for forming the refrigerant bypass passage BP1 are formed on the flanges 81 connected to each other. That is, by forming the first through hole 4 and the second through hole 6 adjacent to each other on a single protrusion, the first and second through holes 4 and 6 are surrounded by the flanges 81 connected to each other. Compared to the case where the two through holes are formed on separate flanges, since the two through holes 4 and 6 are formed on the flanges connected to each other, manufacturing becomes easy and an adhesion to the above stacked plate 2 is improved due to the flange 81 having a single height, so that fluid sealing properties can be improved.

FIG. 13 to FIG. 18 show another embodiment of the present invention, and another embodiment of the present invention will be described with reference to these drawings. The same reference numerals are used for the same parts, and overlapping descriptions are omitted.

After the coolant flows into the coolant inlet 123, it passes through a coolant inlet passage extending downward, a lateral passage extending laterally from the coolant inlet passage, and a coolant discharge passage extending upward, and is then discharged through the coolant outlet 124. Since the coolant passages and the structure of the stacked plates 2 for realizing the same are similar to those of the above-described embodiment, a description thereof will be omitted.

FIG. 15 and FIG. 16, the stacked plate 2 has first through holes 23, 24, and 25 for forming refrigerant inlet passages R1, R2, and R3, a second through hole 26 for forming a refrigerant bypass passage BP2, and third through holes 27 and 28 for forming coolant inflow and outflow passages. A through hole of reference numeral 23 may be formed at a position corresponding to the refrigerant inlet 121 of the cover panel 12, and a through hole of reference numeral 24 may be formed at a point opposite to the through hole of reference numeral 23. The through hole of reference numeral 25 may be formed near the through hole of reference numeral 23, and the through hole of reference numeral 26 may be formed at the same position as the through hole of reference numeral 25. The refrigerant bypass passage BP2 formed by the through hole 26 may be formed at a position corresponding to the refrigerant outlet 122 of the cover panel 12. The third through holes 27 and 28 for forming the coolant passage may be formed at positions corresponding to the coolant inlet 123 and the coolant outlet 124 of the cover panel 12, respectively.

In an embodiment of the present invention, the stacked plates 2 are configured to form two lateral paths RP1 and RP2. The first through hole of reference numeral 23 forms a downward refrigerant inflow passage R1, and the second through hole of reference numeral 24 forms a downward refrigerant inflow passage R2 located on the opposite side of the refrigerant inflow passage R1. The first through hole 25 forms an upward refrigerant discharge passage R3, and the second through hole 26 forms a refrigerant bypass passage BP2. The lateral path RP1 connects the refrigerant inflow passages R1 and R2, and the lateral path RP2 connects the refrigerant inflow passages R2 and R3. The refrigerant bypass passage BP2 is connected to the refrigerant discharge passage R3 and discharges the refrigerant to the same surface as the introduced surface, that is, to the upper surface of the stacked plates 2.

Although preferred embodiments of the present invention have been described in detail above, the scope of the present invention is not limited thereto, and various modifications and improvements by those skilled in the art using the basic concept of the present invention as defined in the following claims are also within the scope of the invention.

INDUSTRIAL APPLICABILITY

The present invention relates to a heat exchanger for vehicles to have an industrial applicability.

The invention claimed is:

1. A heat exchanger for a vehicle configured to perform heat exchange between coolant and refrigerant, comprising:
    a plurality of stacked plates sequentially stacked to form a plurality of refrigerant spaces filled with the refrigerant and a plurality of coolant spaces filled with the coolant;
    a thermal expansion valve disposed in a vicinity of the plurality of the stacked plates; and
    a connection block disposed between the thermal expansion valve and the plurality of the stacked plates,
    wherein the connection block comprises a refrigerant inlet passage for introducing the refrigerant introduced through the thermal expansion valve into the plurality of the stacked plates and a refrigerant discharge passage for introducing the refrigerant discharged from the plurality of the stacked plates into the thermal expansion valve,
    wherein the plurality of the stacked plates are configured to form a refrigerant passage for moving the refrigerant introduced through the refrigerant inlet passage, and a refrigerant bypass passage connected to the refrigerant passage to discharge the refrigerant to the refrigerant discharge passage, and
    wherein the refrigerant passage comprises:
    a first refrigerant inlet passage extending downward;
    a second refrigerant inlet passage extending downward from a position spaced apart from the first refrigerant inlet passage;
    a first lateral path extending in a lateral direction to connect the first refrigerant inlet passage and the second refrigerant inlet passage;
    a refrigerant discharge passage extending upward from a position spaced apart from the second refrigerant inlet passage; and
    a second lateral path extending in a lateral direction to connect the second refrigerant inlet passage and the refrigerant discharge passage.

2. The heat exchanger of claim 1, wherein the first refrigerant inlet passage is formed at the same position as the refrigerant inlet passage, and the refrigerant discharge passage is formed at the same position as the refrigerant discharge passage.

3. A heat exchanger for a vehicle configured to perform heat exchange between coolant and refrigerant, comprising:
    a plurality of stacked plates sequentially stacked to form a plurality of refrigerant spaces filled with the refrigerant and a plurality of coolant spaces filled with the coolant;
    a thermal expansion valve disposed in a vicinity of the plurality of the stacked plates; and
    a connection block disposed between the thermal expansion valve and the plurality of the stacked plates,
    wherein the connection block comprises a refrigerant inlet passage for introducing the refrigerant introduced through the thermal expansion valve into the plurality of the stacked plates and a refrigerant discharge passage for introducing the refrigerant discharged from the plurality of the stacked plates into the thermal expansion valve,
    wherein the plurality of the stacked plates are configured to form a refrigerant passage for moving the refrigerant introduced through the refrigerant inlet passage, and a refrigerant bypass passage connected to the refrigerant passage to discharge the refrigerant to the refrigerant discharge passage, and
    wherein the refrigerant passage comprises:
    a first refrigerant inlet passage extending downward, a second refrigerant inlet passage extending downward from a position spaced apart from the first refrigerant inlet passage;
    a first lateral path extending in a lateral direction to connect the first refrigerant inlet passage and the second refrigerant inlet passage;
    a third refrigerant inlet passage extending downward from a position spaced apart from the second refrigerant inlet passage;
    a second lateral path extending in a lateral direction to connect the second refrigerant inlet passage and the third refrigerant inlet passage;
    a refrigerant discharge passage extending upward from a position spaced apart from the third refrigerant inlet passage; and
    a third lateral path extending in a lateral direction to connect the third refrigerant inlet passage and the refrigerant discharge passage.

4. The heat exchanger of claim 3, wherein the first refrigerant inlet passage is formed at a position spaced apart from the refrigerant inlet passage, and the refrigerant inlet passage is configured to move the refrigerant introduced from the thermal expansion valve in a lateral direction and then supply the refrigerant to the first refrigerant inlet passage.

5. The heat exchanger of claim 4, wherein the refrigerant discharge passage and the refrigerant bypass passage formed in the plurality of the stacked plates are formed at the same position as the refrigerant discharge passage provided in the connection block.

* * * * *